United States Patent
Ganichev et al.

(10) Patent No.: US 9,282,019 B2
(45) Date of Patent: *Mar. 8, 2016

(54) TRACING LOGICAL NETWORK PACKETS THROUGH PHYSICAL NETWORK

(71) Applicant: Nicira, Inc., Palo Alto, CA (US)

(72) Inventors: Igor Ganichev, Mountain View, CA (US); Pankaj Thakkar, Santa Clara, CA (US); Paul Fazzone, San Jose, CA (US); Teemu Koponen, San Francisco, CA (US); Daniel J. Wendlandt, Portola Valley, CA (US)

(73) Assignee: NICIRA, INC., Palo Alto, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/952,538

(22) Filed: Jul. 26, 2013

(65) Prior Publication Data

US 2015/0016298 A1      Jan. 15, 2015

Related U.S. Application Data

(60) Provisional application No. 61/845,942, filed on Jul. 12, 2013.

(51) Int. Cl.
*H04L 12/26*      (2006.01)
(52) U.S. Cl.
CPC .......... *H04L 43/0894* (2013.01); *H04L 43/026* (2013.01); *H04L 43/10* (2013.01)
(58) Field of Classification Search
CPC . H04L 29/06027; H04L 29/70; H03L 63/068; H03L 63/10; H03L 63/4084
See application file for complete search history.

(56) References Cited

U.S. PATENT DOCUMENTS

| | | | |
|---|---|---|---|
| 5,224,100 A | 6/1993 | Lee et al. |
| 5,245,609 A | 9/1993 | Ofek et al. |
| 5,265,092 A | 11/1993 | Soloway et al. |
| 5,781,534 A | 7/1998 | Perlman et al. |
| 6,104,700 A | 8/2000 | Haddock et al. |
| 6,430,160 B1 | 8/2002 | Smith et al. |

(Continued)

FOREIGN PATENT DOCUMENTS

| | | |
|---|---|---|
| JP | 2002-141905 | 5/2002 |
| WO | 95/06989 | 3/1995 |

(Continued)

OTHER PUBLICATIONS

Portions of prosecution history of U.S. Appl. No. 13/968,387, Jul. 7, 2015, Ganichev, Igor, et al.

(Continued)

*Primary Examiner* — Gregory Sefcheck
(74) *Attorney, Agent, or Firm* — Adeli LLP

(57) ABSTRACT

Some embodiments provide a method for a network controller that manages several managed forwarding elements. The method receives a request to trace a specified packet having a particular source on a logical switching element. The method generates the packet at the network controller according to the packet specification. The generated packet includes an indicator that the packet is for a trace operation. The method inserts the packet into a managed forwarding element associated with the particular source. The method receives a set of messages from a set of managed forwarding elements that process the packet regarding operations performed on the packet.

29 Claims, 9 Drawing Sheets

(56) References Cited

U.S. PATENT DOCUMENTS

| | | |
|---|---|---|
| 6,721,334 B1 | 4/2004 | Ketcham |
| 7,079,544 B2 | 7/2006 | Wakayama et al. |
| 7,627,692 B2 | 12/2009 | Pessi |
| 7,706,266 B2 | 4/2010 | Plamondon |
| 7,760,735 B1 | 7/2010 | Chen et al. |
| 7,808,919 B2 | 10/2010 | Nadeau et al. |
| 7,937,492 B1 | 5/2011 | Kompella et al. |
| 8,345,558 B2 | 1/2013 | Nicholson et al. |
| 8,351,418 B2 | 1/2013 | Zhao et al. |
| 8,611,351 B2 | 12/2013 | Gooch et al. |
| 2005/0132044 A1 | 6/2005 | Guingo et al. |
| 2005/0232230 A1 | 10/2005 | Nagami et al. |
| 2006/0028999 A1 | 2/2006 | Iakobashvilli et al. |
| 2006/0029056 A1 | 2/2006 | Perera et al. |
| 2006/0037075 A1 | 2/2006 | Frattura et al. |
| 2006/0206655 A1 | 9/2006 | Chappell et al. |
| 2006/0282895 A1 | 12/2006 | Rentzis et al. |
| 2007/0055789 A1 | 3/2007 | Claise et al. |
| 2008/0049614 A1 | 2/2008 | Briscoe et al. |
| 2008/0049786 A1 | 2/2008 | Ram et al. |
| 2009/0010254 A1* | 1/2009 | Shimada ................ 370/389 |
| 2010/0128623 A1 | 5/2010 | Dunn et al. |
| 2011/0317696 A1 | 12/2011 | Aldrin et al. |
| 2012/0159454 A1 | 6/2012 | Barham et al. |
| 2012/0287791 A1 | 11/2012 | Xi et al. |
| 2013/0044636 A1 | 2/2013 | Koponen et al. |
| 2013/0067067 A1 | 3/2013 | Miri et al. |
| 2013/0332602 A1* | 12/2013 | Nakil et al. ................ 709/224 |
| 2014/0029451 A1 | 1/2014 | Nguyen |
| 2014/0119203 A1 | 5/2014 | Sundaram et al. |
| 2014/0195666 A1 | 7/2014 | Dumitriu et al. |
| 2014/0281030 A1* | 9/2014 | Cui et al. ................ 709/244 |
| 2015/0016286 A1 | 1/2015 | Ganichev et al. |
| 2015/0016287 A1 | 1/2015 | Ganichev et al. |

FOREIGN PATENT DOCUMENTS

| | | |
|---|---|---|
| WO | 2013/184846 | 12/2013 |
| WO | WO 2015/005968 | 1/2015 |

OTHER PUBLICATIONS

Portions of prosecution history of U.S. Appl. No. 13/968,390, Jul. 17, 2015, Ganichev, Igor, et al.

International Search Report and Written Opinion of PCT/2014/036464, Sep. 22, 2014 (mailing date), Nicira, Inc.

Phaal, Peter, et al., "sFlow Version 5," Jul. 2004, 46 pages, sFlow.org.

Phan, Doantam, et al., "Visual Analysis of Network Flow Data with Timeline and Event Plots," month unknown, 2007, pp. 1-16, VizSEC.

* cited by examiner

TRACING LOGICAL NETWORK PACKETS THROUGH PHYSICAL NETWORK

BACKGROUND

Typical physical networks include many routers and switches through which packets travel. In some cases for such networks, an administrator may identify that packets are not being delivered correctly, and therefore may wish to troubleshoot the network. In order to do so, some physical networks have the ability to perform a route trace that shows how far a packet travels. In physical networks, the administrator can often log into the routers and troubleshoot the routing table.

However, in at least some virtualized networks that operate many separate logical networks over the physical network, packets are typically sent across the physical network in tunnels between managed forwarding elements. These tunneled packets are passed through the unmanaged physical forwarding elements (e.g., standard routers) with minimal processing, and inspecting the routers will not provide an administrator with useful information. Thus, methods for troubleshooting virtualized networks are needed.

BRIEF SUMMARY

Some embodiments provide a network controller for managing forwarding elements that performs novel packet tracing operations. In some embodiments, the network controller receives a request to trace a specified packet having a particular source on a logical switching element. In some embodiments, the packet specifies a source address and a destination address that are both associated with the same logical switching element (e.g., on the same logical L2 domain). In response to the request, the network controller generates a traceable packet from the source address to the destination address, and inserts the traceable packet into a managed forwarding element to which an entity (e.g., a virtual machine (VM)) located at the source address connects. After inserting the traceable packet, the network controller receives a set of observations from the managed forwarding elements that indicate certain operations performed on the packet. The network controller, in some embodiments, generates a report regarding the packet tracing operation, for delivery to a user that requested the trace.

In some embodiments, the request is received at the controller through an application programming interface (API) command. A user (e.g., a network administrator), using one of a variety of user interface tools, designs a packet to be traced through the physical network managed by the controller. In addition to the source and destination addresses, the user may specify whether to trace a broadcast packet (i.e., instead of a specific destination address), a payload for the packet, the packet size, or other information.

The network controller generates the packet, and in some embodiments inserts an indicator into a particular location in the packet that specifies the packet as a traced packet. For instance, some embodiments use a single bit at a specific location in the packet header (e.g., a logical VLAN field) that flags the packet as being used for a trace operation. The network controller then sends the packet to the particular managed forwarding element associated with the source of the packet (e.g., the managed forwarding element to which the entity having the source address connects). In some embodiments, this managed forwarding element is a software forwarding element that operates in a physical host machine along with the VM associated with the source address. The network controller then awaits the receipt of observations from the managed forwarding elements through which the packet passes.

In some embodiments, the managed forwarding elements send observations to the network controller in two situations: (1) when sending a traced packet over a tunnel, and (2) when delivering a traced packet to a logical port (though some embodiments do not actually deliver the packet, but instead drop the packet while sending the observation). If the packet is never sent out from the initial managed forwarding element (e.g., because of an access control list operation that drops the packet), then no observations will be sent to the network controller. In some embodiments, the packet tracing operation operates with a specified timeout after which the controller assumes that no additional observations will be delivered. Other than sending the observations and not actually delivering the packet to a VM (or other destination bound to a logical port), the managed forwarding elements process the packet in the same manner as an unmarked packet actually received from a VM. In some embodiments, while processing a packet through several stages, the managed forwarding elements store a register bit indicating that the packet is marked for a trace operation.

In order to send observation messages, the forwarding tables of the managed forwarding elements of some embodiments contain entries that specify when the observation messages should be sent. In some embodiments, these messages contain (i) the packet being processed by the managed forwarding element as received and (ii) the contents of the registers for the packets, from which the controller can identify the relevant data. The forwarding table entry for sending the observation messages, in some embodiments, specifies to the managed forwarding element to copy certain data to the register and then send the register contents to the controller.

Once the network controller receives the observations (or the timeout is reached), the controller of some embodiments generates a report and delivers it to the requesting user. In some embodiments, this report indicates whether the packet was delivered and provides information about each of the received observations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network controller for managing forwarding elements that performs novel packet tracing operations. In some embodiments, the network controller receives a request to trace a packet having a particular source on a logical switching element. In some embodiments, the packet specifies a source address and a destination address that are both associated with the same logical switching element (e.g., on the same logical L2 domain). In response to the request, the network controller generates a traceable packet from the source address to the destination address, and inserts the traceable packet into a managed forwarding element to which an entity (e.g., a virtual machine (VM)) located at the source address connects. After inserting the traceable packet, the network controller receives a set of observations from the managed forwarding elements that indicate certain operations performed on the packet. The network controller, in some embodiments, generates a report regarding the packet tracing operation, for delivery to a user that requested the trace.

In some embodiments, the network controller manages one or more logical switching elements implemented across physical forwarding elements in a distributed, virtualized environment. That is, rather than using a single physical switch to implement a logical switching element, the forwarding responsibilities are spread across managed forwarding elements distributed throughout the network. For instance, some embodiments include switching software within physical host machines (e.g., running on top of or within a hypervisor on the host). This switching software (e.g., open virtual switch ("OVS")) implements the logical switching elements of some embodiments.

Figure 1:
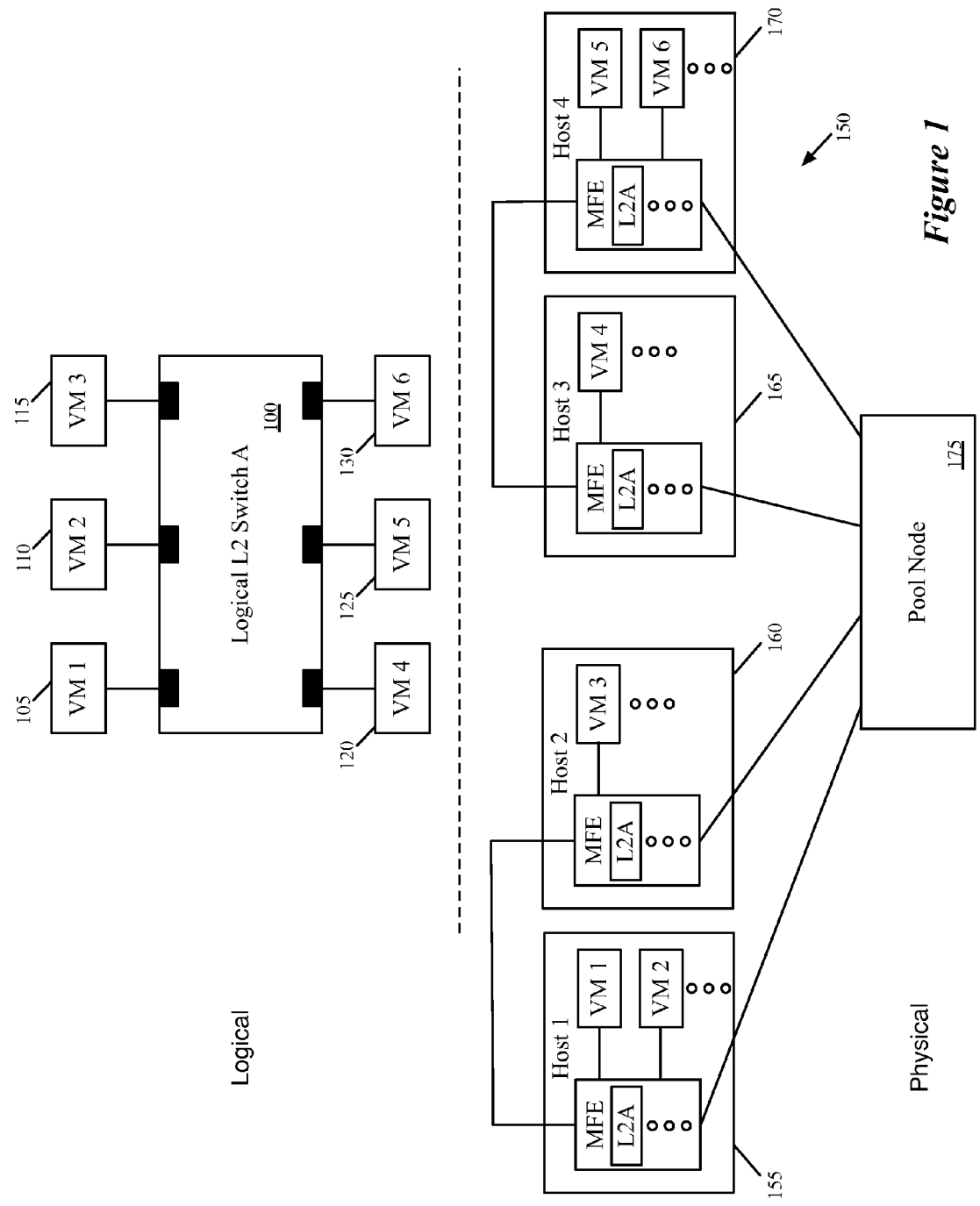
FIG. 1 conceptually illustrates a logical switching element 100 implemented in a physical network.

FIG. 1 conceptually illustrates a logical switching element 100 implemented in a physical network 150. As shown, the logical switching element 100 connects six virtual machines 105-130. Each of these virtual machines 105-130 connects to a logical port of the logical switching element 100. In some embodiments, a user (e.g., network administrator) defines the logical switching element, which may be part of a larger logical network. For instance, the logical switching element may include a logical port that connects to an external gateway (e.g., to an external network), to a logical L3 router (which may also connect to other logical L2 switches), etc.

In some embodiments, the user defines the logical switching element 100 through an application programming interface (API) of the network controller, which translates the user definition into a logical control plane definition of the logical switching element 100. The network controller then converts this logical control plane definition into a logical forwarding plane specification of the logical switching element. The logical forwarding plane specification, in some embodiments, includes logical forwarding table entries (logical flow entries) that specify rules for forwarding packets to logical ports of the logical switching element. For instance, the logical control plane of some embodiments includes bindings between MAC addresses of VMs and logical ports, and the logical forwarding plane specifies flow entries for forwarding packets to the logical ports based on matches of the MAC addresses.

In addition, the network controller of some embodiments converts the logical forwarding plane data into physical control plane data that specifies rules for the managed forwarding elements to follow in order to implement the logical switch. This physical control plane data includes matches over the logical switch itself (e.g., based on the source of the packet), as well as entries for placing packets into tunnels from one managed forwarding element to another (and receiving packets from these tunnels). These rules, in some embodiments, incorporate data from the managed forwarding elements, such as physical ports and tunnel IP address information. The network controller then pushes this physical control plane data down to the managed forwarding elements. The network controller and generation of flow entries of some embodiments is described in greater detail in the U.S. Publication 2013/0058228, which is incorporated herein by reference.

The controller, as mentioned, pushes these flow entries to several managed forwarding elements in some embodiments, such that the logical switching element (and/or other logical forwarding elements, such as logical routers) are implemented in a distributed, virtualized fashion. The physical network 150 of FIG. 1 illustrates that the six VMs 105-130 are hosted on four different host machines 155-170. Some embodiments may only host one VM from a particular logical network on a single machine, while other embodiments may put multiple VMs from a logical network on the same machine, as in this case with the hosts 155 and 170. As shown, in the virtualized environment, each of these hosts 155-170 also hosts additional virtual machines beyond those connected to the logical switch 100. That is, many tenants may share the use of the physical network 150, and in fact may share use of a single physical host.

Operating on each host (e.g., within the hypervisor on the host) is a managed forwarding element (MFE). The MFE, in some embodiments, is a software forwarding element to which the network controller connects and pushes down flow entries for various logical forwarding elements. In this case, because VMs from the logical switch 100 are located on each of the four illustrated hosts 155-170, the MFE in each of these hosts implements the logical switching element 100. That is, each of the illustrated MFEs has flow entries in its forwarding tables for logically forwarding packets to the logical ports associated with the different VMs 105-130.

In addition to the host machines 155-170, the physical network 150 further includes a pool node 175, also referred to as a service node in some embodiments. The pool node 175 connects to each of the hosts within the network, and serves to forward packets between edge MFEs (those located in the hosts, at the edge of the network) that do not have direct connections. As shown, the first MFE in host 155 and second MFE in host 160 have a tunnel connection between them, as do the third MFE in host 165 and the fourth MFE in host 170. However, the first MFE does not have a direct tunnel connection to the third or fourth MFE, nor does the second MFE. Instead, each of the four MFEs have tunnels defined to ports of the pool node 175. In some embodiments, packets sent along each of these tunnels pass through one or more unmanaged forwarding elements (e.g., standard, dedicated routers) that do not receive flow entries from the network controller and pass along the packets with only minimal processing.

In addition, the pool node 175 may include connections to a remote domain in some embodiments (e.g., a separate domain that implements a different logical L2 switch). The logical switch 100 could include a seventh port for connecting to this remote domain, and packets sent from one of the VMs 105-130 to the remote domain would be forwarded by the pool node through a physical connection to the remote domain.

Within the above-described environment, in which the network controller connects to each of the MFEs (including the pool node), in some embodiments the controller receives a request through an application programming interface (API) command. A user (e.g., a network administrator), using one of a variety of user interface tools, designs a packet to be traced through the physical network managed by the controller. In addition to the source and destination addresses, the user may specify whether to trace a broadcast packet (i.e., instead of a specific destination address), a payload for the packet, the packet size, or other information.

The network controller generates the packet, and in some embodiments inserts an indicator into a particular location in the packet that specifies the packet as a traced packet. For instance, some embodiments use a single bit at a specific location in the packet header (e.g., a logical VLAN field) that flags the packet as being used for a trace operation. The network controller then sends the packet to the particular managed forwarding element associated with the source of the packet (e.g., the managed forwarding element to which the entity having the source address connects). Some embodiments additionally set registers associated with the packet at the particular managed forwarding element in order to simulate the managed forwarding element receiving the packet through a particular physical port associated with the source address.

In some embodiments, this managed forwarding element is a software forwarding element that operates in a physical host machine along with the VM associated with the source address. The network controller then awaits the receipt of observations from the managed forwarding elements through which the packet passes.

In some embodiments, the managed forwarding elements send observations to the network controller in two situations: (1) when sending a traced packet over a tunnel, and (2) when delivering a traced packet to a logical port (though some embodiments do not actually deliver the packet, but instead drop the packet while sending the observation). If the packet is never sent out from the initial managed forwarding element (e.g., because of an access control list operation that drops the packet), then no observations will be sent to the network controller. In some embodiments, the packet tracing operation operates with a specified timeout after which the controller assumes that no additional observations will be delivered. Other than sending the observations and not actually delivering the packet to a VM (or other destination bound to a logical port), the managed forwarding elements process the packet in the same manner as an unmarked packet actually received from a VM. In some embodiments, while processing a packet through several stages, the managed forwarding elements store a register bit indicating that the packet is marked for a trace operation.

In order to send observation messages, the forwarding tables of the managed forwarding elements of some embodiments contain entries that specify when the observation messages should be sent. In some embodiments, these messages contain (i) the packet being processed by the managed forwarding element as received and (ii) the contents of the registers for the packets, from which the controller can identify the relevant data. The forwarding table entry for sending the observation messages, in some embodiments, specifies to the managed forwarding element to copy certain data to the register and then send the register contents to the controller.

Once the network controller receives the observations (or the timeout is reached), the controller of some embodiments generates a report and delivers it to the requesting user. In some embodiments, this report indicates whether the packet was delivered and provides information about each of the received observations.

The above description introduces the packet tracing operations of some embodiments. Several more detailed embodiments are described below. First, Section I describes the operation of a network controller that performs a packet tracing operation. Next, Section II describes the operation of the managed forwarding elements that receive and process traced packets. Section III then describes several examples of packet tracing operations in a network. Finally, Section IV describes an electronic system with which some embodiments of the invention are implemented.

I. Network Controller Operation

As indicated, in some embodiments the network controller generates a traceable packet according to a request received from a user and inserts this packet at a particular MFE. In order to generate such a packet, the network controller of some embodiments knows how the packet headers should appear when received at the MFE from a specified source port (i.e., what data should be in the packet headers). Thus, the network controller can generate a packet that mimics a packet actually received at the source port of the MFE.

Figure 2:
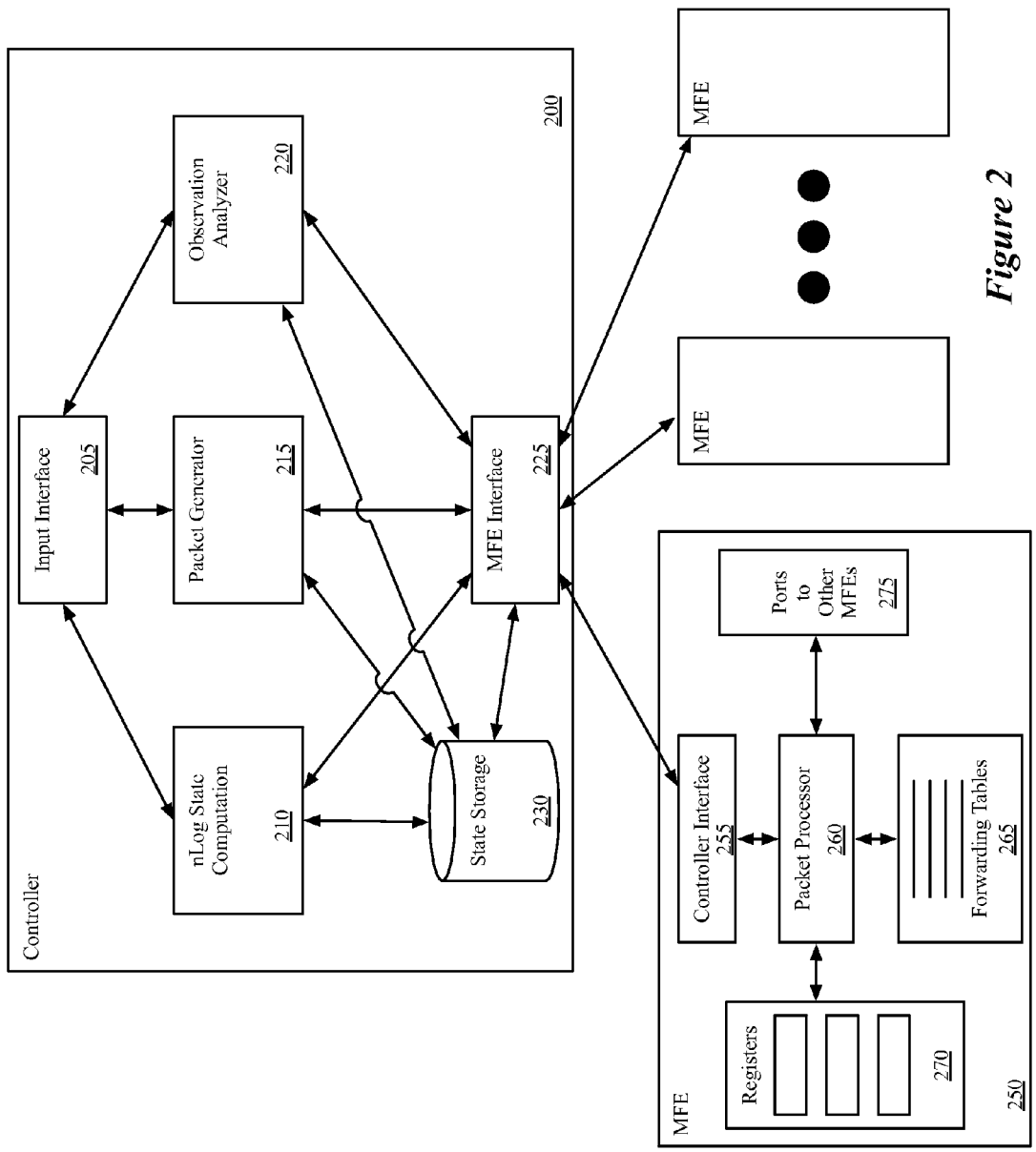
FIG. 2 conceptually illustrates a network controller with packet generation and tracing capability, as well as a managed forwarding element that analyzes and forwards packets and includes the capability to send observations for traceable packets to the controller.

FIG. 2 conceptually illustrates a network controller 200 with packet generation and tracing capability, as well as a managed forwarding element 250 that analyzes and forwards packets and includes the capability to send observations for traceable packets to the controller 200. As shown, the controller 200 includes an input interface 205, an nLog state computation module 210, a packet generator 215, an observation analyzer 220, and a managed forwarding element interface 225. In addition, the network controller 200 includes one or more state storage database 230, which in some embodiments stores input and/or output of the nLog state computation module 210.

The input interface 205 of some embodiments receives input from one or more users to define logical networks (e.g., sets of workloads (such as VMs) connected through logical switches, logical routers, middleboxes, gateways to external networks, etc.), as well as requests to trace packets sent through a logical switch on such a logical network. For example, a user could define a logical switch such at that shown in FIG. 1, described above. In addition, with such a logical switch defined and implemented within the physical network managed by the network controller 200 (which includes the MFE 250), the user could request a packet tracing operation for a packet sent from one logical port of the logical switch 100 to another logical port of the logical switch.

In some embodiments, the request received at the input interface specifies the logical ports in terms of source and destination MAC addresses entered (or selected) by the user. In other embodiments, the user specifies a source logical port (e.g., in terms of a UUID used to represent the port) at which to insert the packet and a destination MAC address that is used in the packet itself (a source MAC address will be placed in the packet header as well, based on the specified logical port). In addition, the request may include additional parameters beyond the source and destination addresses. For instance, in some embodiments the user specifies a payload for the packet. When no payload is specified, the controller inserts a default payload for the packet. Users can also specify a frame size and/or ethertype for the traced packet. In some embodiments, the user can specify a timeout which specifies a duration (e.g., 100 ms, 1 s, 10 s, etc.) that the controller will wait for observations from the managed forwarding elements in the network.

In addition, instead of specifying a specific destination address corresponding to a single logical port on the logical switch, in some embodiments the user may wish to send a broadcast packet on the logical switch. In some embodiments, when the request does not include a destination address, or does not include a destination address that corresponds to a particular VM, the controller generates a traceable broadcast packet for insertion into the network at the specified source logical port. In other embodiments, the user is required to specify a destination address for each trace operation, and must affirmatively specify a broadcast destination in order to perform the trace on a broadcast packet.

When the input interface 205 receives a specification of a logical network, the interface of some embodiments translates this specification into logical control plane data that defines the logical network, and passes this data to the nLog state computation module 210. In some embodiments, the input interface 205 reads this logical control plane data into input tables of the state computation module 210. The nLog state computation module 210 of some embodiments includes a table mapping engine with a set of input tables and output tables, and maps records in the input tables to records in the output tables according to a set of rules. More specifically, some embodiments translate logical control plane data into logical forwarding plane data and subsequently translate the logical forwarding plane data into physical control plane data that can be passed down to the managed forwarding elements that implement the logical network. The nLog state computation module 210 of some embodiments is described in greater detail in U.S. Publication 2013/0058228, which is incorporated by reference above.

In some embodiments, the physical control plane data for a particular specified logical network includes a set of flow entries used by the managed forwarding elements to implement the logical network. For instance, a flow entry for performing a logical forwarding decision might state that if a packet matches a specific logical switch (e.g., based on its source MAC address or ingress port) and the destination address is a particular MAC address, then the packet should be forwarded to a particular logical port of the logical switch. An example of such a flow would state "If match L2 switch Q and destination MAC B→forward to logical egress port X". The physical control plane flow entries additionally include entries for identifying a physical port to which to send the packet and placing the packet in tunnels. To continue the above example, the physical control plane entries might include a flow stating "If logical egress=port X→encapsulate with remote tunnel information Z and send to physical port P".

The above control plane entries will be matched for packets that are sent over the network as part of normal network traffic or which are generated by the controller for a trace operation. However, some embodiments also include flow entries for the trace operation, which are passed to the managed forwarding elements as well. These entries basically specify that if the packet being sent over the tunnel (or delivered to a final destination) is a traced packet, then certain data should be copied to the registers and sent as an observation message to the controller. For example, using the above case, a flow entry might state "If sending packet with tunnel information Z and register bit J==1→copy MFE ID and tunnel information Z to registers and send register data with packet to controller". Similarly, for a delivery observation message, a flow entry might state "If sending packet to physical port R and register bit J==1→drop packet, copy MFE ID and physical port ID to register and send register data with packet to controller". These flow entries, like the other physical control plane data, are converted by the managed forwarding element into physical forwarding plane data in the forwarding tables of the managed forwarding element, as described below.

In some embodiments, the nLog state computation module 210 stores its output state in the state storage database(s) 230. This database 230 stores MAC address to logical port bindings, physical control plane data output by the nLog state computation module 210, and other data in some embodiments.

The operations of the nLog state computation module 210 may take place at a different time than the packet tracing operations. That is, in some embodiments the controller 200 initially generates (using the nLog state computation module 210) the flow entries for a logical network, both for the packet tracing operation and the general logical network functionality. While the flow entries may require updating as the network changes (i.e., due to the user adding or removing entities from the network, modifications to the physical network, etc.), the packet tracing operations performed by both the controller and the managed forwarding elements take place at conceptually a different time (i.e., in response to user requests, which may occur well after the generation and distribution of the flow entries by the controller 200).

The packet generator 215 receives requests to trace packets through the input interface 205. The packet generator 215, in some embodiments, receives the source and destination logical ports, payload specification, frame size, etc., and generates a packet with the appropriate headers and payload. In addition, the packet generator 215 appends an indicator in the packet that specifies to a managed forwarding element processing the packet that the packet is a traced packet. This signifies to the MFE (1) that it should send observations back to the controller when it performs specific operations on the packet and (2) that it should drop the packet once it has made the decision to deliver the packet to its intended recipient at the destination address. In addition, the controller of some embodiments appends an identifier for the issuing controller (i.e., the controller 200) as well as a trace operation session ID to differentiate between multiple packet tracing operations.

Some embodiments append this data at the end of the payload. After generating the packet, the controller sends the packet to the appropriate MFE (that which connects to the source logical port) through the MFE interface 225.

The observation analyzer 220 receives observations about a traced packet sent by the MFEs to the network controller 200. In some embodiments, a MFE sends an observation to the controller whenever it sends a traced packet out over a tunnel to another MFE. In addition, when a MFE delivers a traced packet to its destination (or would deliver the packet, if it was not a traced packet generated by the network controller), the MFE sends an observation to the controller. These packets are received at the MFE interface 225 and sent to the observation analyzer 220. The structure of these observations are discussed in further detail below.

The observation analyzer 220 of some embodiments performs operations to deduce certain data from the received observations. For instance, for observations indicating that the packet was forwarded into a particular tunnel, the observation analyzer uses the mappings contained in the state storage 230 to identify the remote IP address to which the packet was sent. For observations indicating delivery to a logical port, the observation includes a physical port of the MFE through which the packet would be sent, which the observation analyzer 220 maps to the logical port using the data in the state storage 230.

In some embodiments, the observation analyzer generates a report for the traced packet. Some embodiments provide a summary report to the user through the input interface 205 that indicates whether the packet successfully reached its destination(s), to which destinations it was delivered, packet information specified in the request (source/destination addresses, frame size, timeout duration, etc.), the number of observations received, how many times the packet was forwarded, and a time stamp that indicates when the traced packet was sent by the controller.

In addition, for each observation received, some embodiments include additional information for presentation to the user. This information may include whether the observation was sent for forwarding (into a tunnel) or delivery to a destination, information about the source and destination MFE for a particular tunnel, time duration from when the packet was sent by the controller to when the observation was received, remote IP address (for observations indicating that the packet was forwarded into a tunnel), and logical port to which the packet would have been delivered (for observations indicating delivery).

As shown, the controller connects to one or more managed forwarding elements through its MFE interface 225. Through this interface, the controller (i) distributes physical control plane data to the MFEs, (ii) sends traced packets for insertion into the physical network at a particular MFE and (iii) receives observations regarding traced packets from the MFEs in the physical network. In some embodiments, the communications channel between the controller and the MFE for the purpose of the packet tracing operations is the same channel through which the physical control plane entries are pushed down to the MFE (e.g., using a particular communication protocol such as OpenFlow). In some embodiments, the communication through this interface is a TCP connection between the controller and a specific control port of the MFE (the interface 255, described below). Thus, IP reachability is required between the controller and the control port of the MFE. Some embodiments use a specific VLAN for control channel connectivity.

While the controller 200 connects to multiple MFEs, FIG. 2 displays additional detail regarding a particular one of the MFEs 250, which is illustrative of all of the MFEs in some embodiments. This MFE 250 may be an edge managed forwarding element which resides in a machine that hosts VMs, a pool node, etc. The MFE 250 includes a controller interface 255, a packet processor 260, a set of forwarding tables 265, a set of registers 270, and a set of ports 275 to other managed forwarding elements.

The controller interface 255 enables the managed forwarding element to communicate with the network controller 200. Through this interface, the MFE 250 receives physical control plane data that it converts (e.g., using a module not shown in this figure) into logical forwarding plane data that populates the forwarding tables 265. In addition, through the controller interface 255, the MFE 250 receives traced packets for processing and sends observation messages back to the controller.

The packet processor receives packets (e.g., from the controller interface, from the ports 275) and processes the packets using the forwarding tables 265. The forwarding tables 265, in some embodiments, include entries for one or more unaffiliated logical networks that are virtualized over the physical network. Each entry includes a condition and a corresponding set of actions to perform if the condition is matched, in some embodiments. For instance, a table entry might specify that if a particular bit is set to 1 in the packet (or in a register) and a packet is being sent through a tunnel, then send a particular observation message to the controller. Another example of a forwarding table entry is that if a packet is received from a particular physical port, then set a particular logical ingress port for the packet in a register.

The registers 270 are used by the packet processor 260 as a temporary storage when processing a packet (e.g., in memory). In some embodiments, the packet processor 260 uses one or more registers per packet, such that numerous registers may be created at a single time when numerous different packets are being processed. The temporary information may include an indication that a packet is for a tracing operation, logical context information that specifies information about the logical switching element through which a packet is logically sent, etc. In some embodiments, the forwarding table entries that cause the packet processor 260 to send an observation to controller 200 specify to write certain data to the registers 270 and then send a copy of the packet along with the register contents to the controller 200.

A more detailed description of a managed forwarding element of some embodiments can be found in U.S. Publication 2013/0058250, which is incorporated herein by reference. One of ordinary skill in the art will recognize that both the network controller and the managed forwarding element of some embodiments includes various additional modules not shown in FIG. 2.

Figure 3:
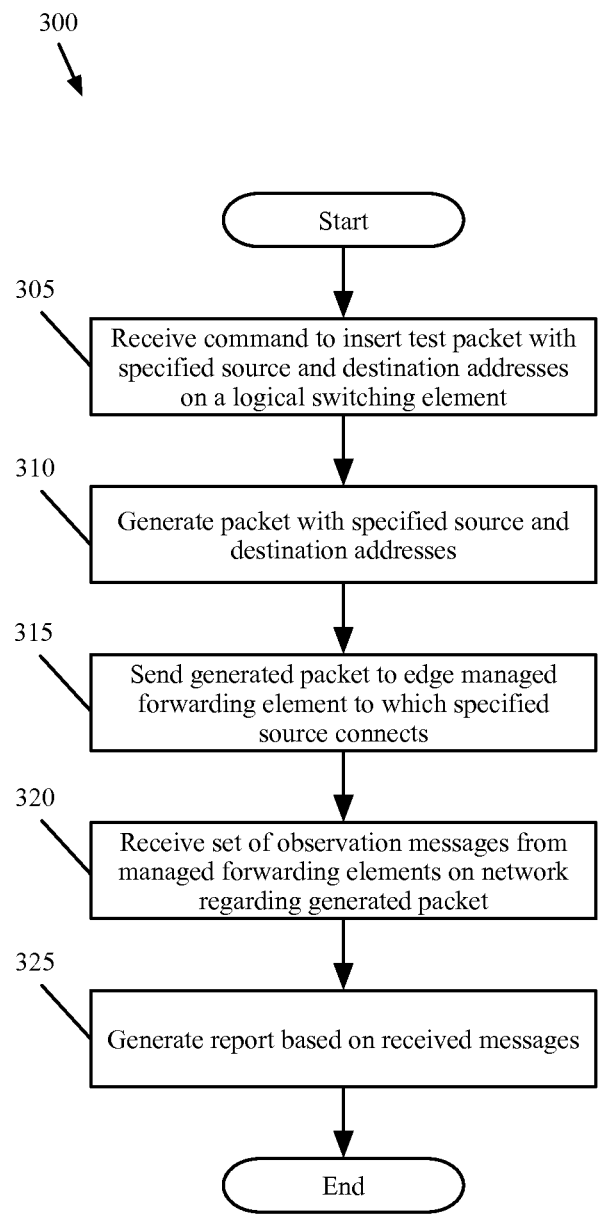
FIG. 3 conceptually illustrates a process performed by the network controller of some embodiments in order to execute a packet tracing operation.

FIG. 3 conceptually illustrates a process 300 performed by the network controller of some embodiments in order to execute a packet tracing operation. The process 300 is performed, in some embodiments, by a network controller such as that shown above in FIG. 2. As shown, the process 300 begins by receiving (at 305) a command to insert a test packet with specified source and destination addresses on a logical switching element into the physical network managed by the controller. In some embodiments, the controller requires that the source and destination addresses be connected to the same logical L2 switch (e.g., that they not be located on different L2 switches connected by a router). However, the source or destination address are not necessarily both VMs. For instance, the packet could be a broadcast packet, or could have as a source or destination a logical port that connects to an external network (e.g., via a gateway). As described above, the request may additionally include a timeout duration, a payload for the packet, or other parameters.

Next, the process 300 generates (at 310) a packet with the specified source and destination addresses. In some embodiments, these addresses are MAC addresses that represent VMs (more specifically, virtual interfaces (VIFs) of VMs), gateways that connect the logical switch to external networks, connections to a different logical switch in a different controller domain, etc. The controller logic has the ability to generate a packet that mimics packets arriving at a MFE from the source address with the destination address as the intended recipient. In addition, the controller stores an indicator in the packet (e.g., in the packet header) that denotes the packet as a traced packet. In some embodiments, the controller uses a specific bit in the logical VLAN portion of the header. Furthermore, some embodiments append to the end of the payload additional information regarding the packet tracing operation, such as a controller identifier that uniquely identifies the controller issuing the packet and a tracing operation identifier that uniquely identifies the particular trace operation issued by the controller.

The process then sends (at 315) the generated packet to the edge managed forwarding element to which the source address connects. In some embodiments, this binding information (of logical port to physical port of an MFE) is stored by the network controller along with the binding of MAC address to logical port. In some embodiments, a particular logical port (and thus source address) could reside on multiple MFEs. While a VM will be connected to one MFE, a gateway to an external network or a connection to a different logical switch domain might connect to several different MFEs (e.g., all of the pool nodes in the physical domain). In this case, some embodiments allow the user to specify to which particular physical MFE the packet will be sent. When the user does not specify one of the MFEs, the controller chooses one (e.g., randomly, from an ordered list, etc.) in some embodiments. When sending the packet to the edge MFE, in some embodiments the controller also accesses the registers (e.g., via a command over the communications channel with the MFE) associated with the packet on the MFE. The controller, in some embodiments, sets register values at the MFE that mimic those for a packet received from the specified source address. The behavior of the edge MFE (as well as the other MFEs that process the traced packet) will be described in greater detail below in Section II.

The process 300 next receives (at 320) a set of observation messages from MFEs in the physical network regarding the generated packet. As described in further detail below, the observation messages are sent to the network controller when either of two actions is taken by an MFE: (1) the MFE sends the packet to another MFE via a tunnel, or (2) the MFE delivers the packet to a logical port. Different observations that provide different information for the two types of actions are received by the controller in some embodiments. For instance, for forwarding via a tunnel, the observation includes an indicator of the MFE performing the action and a tunnel identifier in some embodiments. From this information the controller can determine a remote IP for the tunnel using the network state data that it stores. This may be the remote IP of a port at the destination MFE of the tunnel. In some embodiments, the tunnel may also end at an entity in an external network (e.g., if the logical port to which the packet is sent corresponds to a remote IP in an external network). For delivery to a logical port, the observation of some embodiments includes an indicator of the MFE performing the action and a physical port through which the packet would be delivered if it was not a traced packet. From this information, the controller can determine a logical port identifier (e.g., of a gateway, a VM, etc.) to which the packet is sent based on the mappings stored in its network state data.

Finally, the process 300 generates (at 325) a report based on the received observation messages, then ends. The report, in some embodiments, indicates whether the packet successfully reached its destination(s), to which destinations the packet was delivered, packet information specified in the request (source/destination addresses, frame size, timeout duration, etc.), the number of observations received, how many times the packet was forwarded, and a time stamp that indicates when the traced packet was sent by the controller.

In addition, for each observation received, some embodiments include additional information. This information may include whether the observation was sent for forwarding (into a tunnel) or delivery to a destination, information about the source and destination MFE for a particular tunnel, time duration from when the packet was sent by the controller to when the observation was received (which is useful for measuring the latency of the network), remote IP address (for observations indicating that the packet was forwarded into a tunnel), and logical port to which the packet would have been delivered (for observations indicating delivery).

II. Managed Forwarding Element Operation

The above section describes the behavior of the network controller to perform a packet tracing operation, as well as the structure of the managed forwarding elements that send observations. As mentioned, the network controller inserts a traceable packet into the network at a particular managed forwarding element and then receives observation messages from the managed forwarding elements. The following section describes in further detail the operation of the MFEs to process the packets and generate the observation messages.

Figure 4:
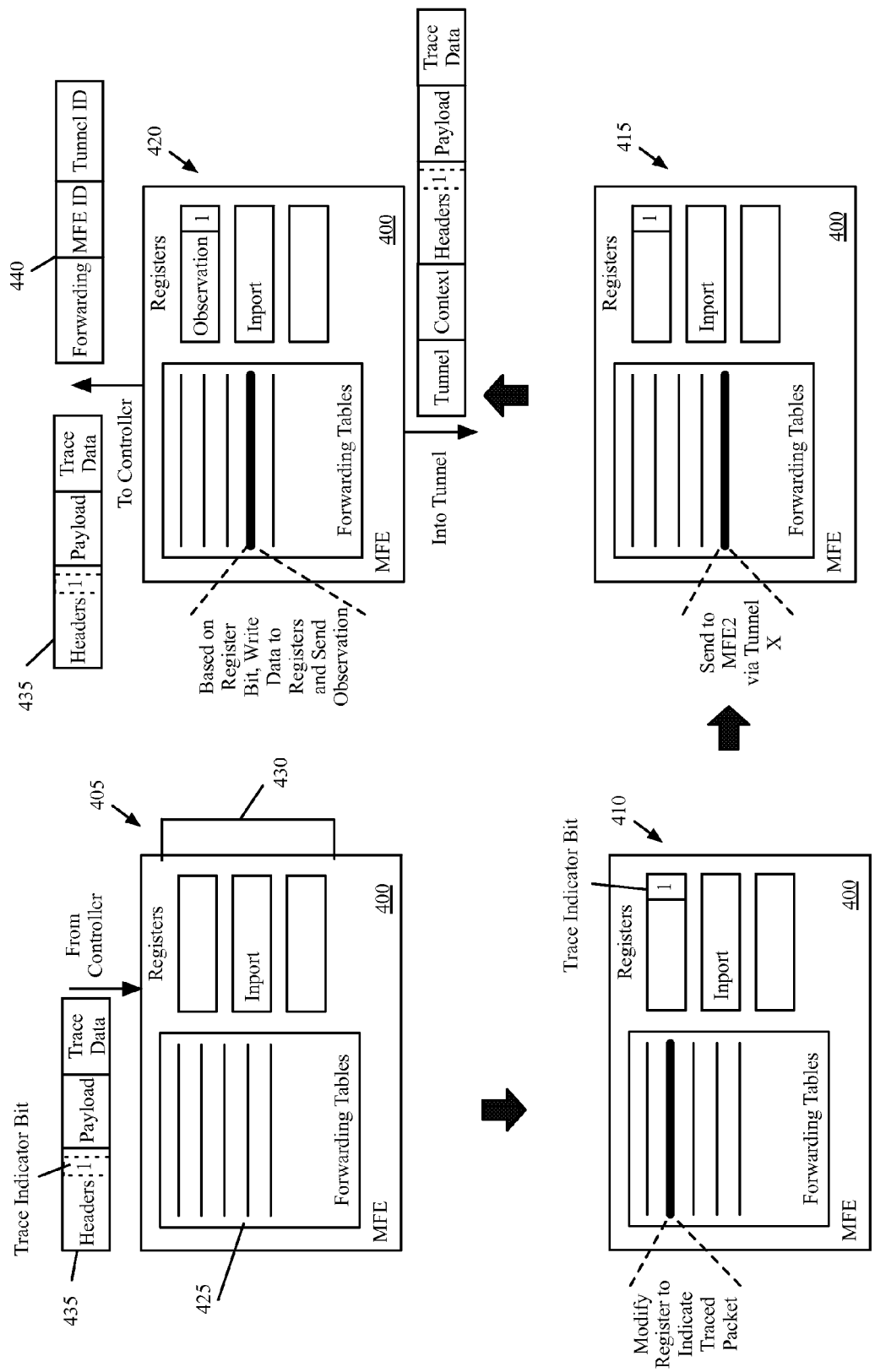
FIG. 4 conceptually illustrates the processing performed by a managed forwarding element that receives a packet from a network controller, processes the packet, sends the packet out over a tunnel, and sends an observation to the network controller.

FIG. 4 conceptually illustrates the processing performed by a managed forwarding element 400 that receives a packet from a network controller, processes the packet, sends the packet out over a tunnel, and sends an observation to the network controller. This figure illustrates the processing over four stages 405-420.

The managed forwarding element 400 of some embodiments may be a software forwarding element that runs on or within a hypervisor on a VM host in a virtualized environment. That is, in some embodiments the MFE 400 is one piece of software that runs in the same physical machine as VMs that connect to the physical network through the MFE 400. In some embodiments, the MFE 400 may be either a software or hardware forwarding element that operates on a dedicated box, separate from the machines hosting VMs. For instance, the pool nodes of some embodiments are dedicated boxes with software or hardware forwarding elements for performing the pool node functionality.

As shown at the first stage 405, the managed forwarding element 400 includes one or more forwarding tables 425 and one or more registers 430. The forwarding tables 425, in some embodiments, include forwarding entries pushed down to the MFE 400 from a network controller as physical control plane data and then converted into physical forwarding plane data by the MFE. The forwarding tables 425, in some embodiments, include entries for several unaffiliated logical networks that are virtualized over the physical network. For instance, if the machine on which the MFE 400 resides hosts VMs belonging to seven different logical networks, then the forwarding tables 425 include entries for these seven different networks, while maintaining isolation between the networks.

The registers 430 of the MFE 400 serve as temporary, quick-access storage for information while processing a packet. As described in detail in U.S. Publication 2013/

0058250, which is incorporated by reference above, some embodiments resubmit a packet to the forwarding tables of the MFE several times in order to fully process the packet. During this processing, the MFE 400 uses the registers 430 to temporarily store information (e.g., logical context information, packet tracing information, etc.) about the packet. In addition, some embodiments send the contents of the registers to the controller as part of an observation message.

At the first stage 405, the MFE 400 receives a packet 435 directly from a network controller that manages the MFE. As described above, in some embodiments the network controller uses the same channel (and communication protocol) to send this packet as to send flow entries. In other embodiments, the packet is sent through a different channel. As shown, the packet 435 includes a payload and a set of headers. The payload may be specified by the user, or a default payload may be used. The headers include a source MAC address and a destination MAC address as specified by the user who requests the packet tracing operation, among other data, in some embodiments. Furthermore, as illustrated, the headers include a trace indicator bit that is set to "1" to indicate that the packet is a traced packet. In some embodiments, this bit is set within a logical VLAN field of the header. In addition, appended to the payload (either within the payload portion of the packet or after the payload portion), the packet 435 includes trace operation data. This trace operation data includes, in some embodiments, a controller ID that identifies the issuing controller as well as a trace operation session ID that identifies the particular trace operation that issued the packet. In some cases, multiple trace operations may be issued, and the trace data allows the controller to identify to which trace operation a particular observation applies.

Furthermore, along with the packet, the controller of some embodiments sends a command to set register information so as to mimic the receiving of the packet through a particular physical port associated with the source address. In the case of a packet for which the source is a VM, the register data simply indicates a physical port to which the VM connects. When the MFE actually receives a traffic (non-trace operation) packet from the VM through this physical port (e.g., virtual interface), the MFE sets this physical port in the register. Because the traced packet is not actually received through this physical port, the controller command sets the physical port in the register so that the MFE treats the packet using the same flow entries (i.e., so the same flow entries match the packet).

The "source" of the traced packet (as set by the user requesting the trace) might not be a VM, however. For example, the source could be a gateway that connects to an external network (e.g., an unmanaged network). In this case, the MFE 400 to which the packet is sent would be an extender in some embodiments that contains a port facing the external network. However, whereas a physical port on an edge MFE only connects to a single VM in general, this port on the extender may face numerous external networks that connect to different logical networks, which correspond to different logical ports (potentially of different logical switches). Accordingly, some embodiments use different physical VLANs to bridge into different logical ports, and this VLAN data as well as the physical port will be set in the register for trace operation packets.

In other trace operations, the source might be a remote domain that connects to the local domain via a pool node via a particular tunnel with a specific interdomain context. For these operations, the controller of some embodiments sets in the registers for the packet both the physical port of the pool node over which packets from the particular tunnel are received and the interdomain context.

In some embodiments, the controller also sets one or more bits in the register to indicate that the packet is a trace packet received from the controller. VMs or other entities on the network sending packets to the MFE do not have access to the registers, so this prevents such entities from sending out their own trace packets. Without such a precaution, a VM could send numerous (e.g., thousands, millions, etc.) trace packets to the MFE as part of a denial of service attack on a controller, as these packets would spawn numerous observations sent to the controller.

The MFE 400 receives the packet 435 and begins processing the packet through its forwarding tables. As mentioned, the forwarding tables include numerous flow entries (e.g., on the order of hundreds or thousands of entries) which take the form of a match and corresponding action or set of actions. That is, if the packet matches a flow entry, the entry specifies one or more actions for the MFE to take. In addition, in some embodiments the flow entries have different priorities, such that if two or more entries are matched, the MFE performs the action or actions for the entry with the highest priority. As shown by the thicker line in the forwarding tables 425 in the second stage 410, at this stage a flow entry is matched that specifies to modify a particular bit in a particular register in order to indicate that the current packet is a traced packet. Thus, as shown, one of the registers 430 is modified to specify this trace indicator bit. In some embodiments, this entry has a high priority so that the first operation the MFE performs upon receiving a traced packet is to set this register bit. In some embodiments, this bit is set by the controller specifying register values and therefore this flow entry is not required.

In the third stage 415, a different flow entry is matched, as shown by the thicker line in the forwarding tables 425. This flow entry specifies to send the packet to a different MFE via a particular tunnel. Not shown in this diagram are several processing entries that would be matched in between the second and third stages 410 and 415. In some embodiments, to get to the point of sending the packet out via a tunnel, the MFE would have already identified the source address stored in the packet and/or physical inport entered in the register as correlating to a particular logical input port (and therefore a particular logical switch), performed logical L2 forwarding to identify a destination logical port that correlates to the packet's destination address (and encapsulated the packet with a logical context that includes at least the destination logical port), and mapped that destination logical port to a physical destination.

For instance, if the trace packet specifies a source MAC A and a destination MAC B (both corresponding to VMs), and the physical port specified in the register is port P (which is the port of the MFE 400 to which the VM having MAC A connects), then the MFE first maps the physical port P to a logical port X on logical switching element Q. Because the logical switching element Q is then matched (e.g., with this information stored in a register), the MFE then maps the destination address B to a logical port Y on the logical switching element Q, and encapsulates the packet with the destination logical port Y. This logical port Y maps to a remote destination Z (e.g., a remote IP or a port of a different MFE). Based on this remote destination Z, the MFE determines to encapsulate the packet to be sent in a tunnel T.

At the fourth stage 420, the resubmitted packet matches a flow entry to write data to the registers for the packet and to send an observation to the controller based on (i) the trace indicator bit stored in the register and (ii) the decision to send the packet out through a tunnel. As shown, the MFE sends an observation message to the network controller from which it received the packet. In some embodiments, this observation message contains (i) the packet as received and (ii) the contents of the registers. As such, in some embodiments the flow entry that specifies to send the observation also specifies that the MFE first write certain data into the registers.

This data, which is then sent as part of observation message 440, includes an (i) an indicator that the observation is a forwarding observation (i.e., that the traced packet is being sent into a tunnel), (ii) a MFE ID specifying that the MFE 400 is sending the observation, and (iii) a tunnel ID denoting the tunnel through which the packet is sent. Some embodiments also send a remote IP of the MFE at which the tunnel terminates, while in other embodiments the controller determines this data based on its stored network state information. One of ordinary skill in the art will recognize that different forwarding observations may include different information.

As indicated, the MFE 400 sends the packet 435 as received to the controller as part of the observation message in some embodiments. In other embodiments, the MFE sends to the controller the packet with the encapsulations that is sent to the MFE (described below). The controller, in some embodiments, only uses the packet to read the trace data stored in the packet (e.g., the controller ID and the trace operation session ID), and reads all other pertinent information from the register contents sent as the observation message.

Furthermore, the MFE 400 also sends out the packet 435 through the tunnel to another MFE (e.g., the destination MFE, a pool node that connects to a destination MFE, etc.), which is now further encapsulated. In addition to the previous headers, the packet is now encapsulated with a logical context (e.g., the destination logical port) and a tunnel encapsulation. In some embodiments, the MFE 400 also clears out the registers after processing the packet 435 (e.g., deletes the registers from memory).

Figure 5:
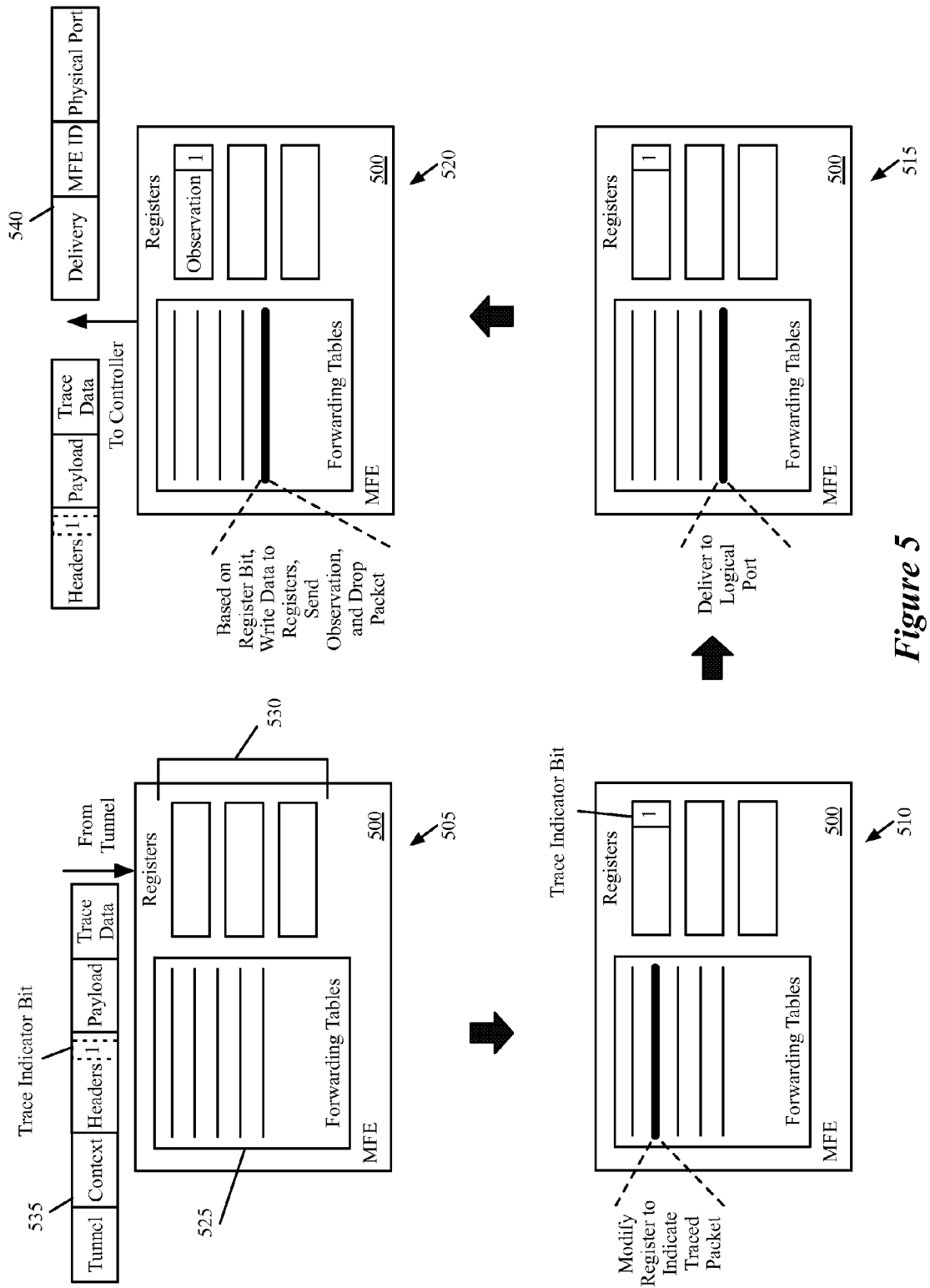
FIG. 5 conceptually illustrates the processing performed by a managed forwarding element that receives a packet from another managed forwarding element through a tunnel, processes the packet, identifies that the packet should be delivered to a logical port, and sends an observation to the network controller.

The previous example illustrates an MFE processing a packet from a controller and sending a forwarding observation message. In the managed networks of some embodiments, MFEs also send observations when delivering traced packets to logical ports. FIG. 5 conceptually illustrates the processing performed by a managed forwarding element 500 that receives a packet from another managed forwarding element through a tunnel, processes the packet, identifies that the packet should be delivered to a logical port from the MFE, and sends an observation to the network controller. This figure illustrates the processing over four stages 505-520.

As with the MFE 400, the managed forwarding element 500 of some embodiments may be a software forwarding element that runs on or within a hypervisor on a VM host in a virtualized environment. In this case, the MFE operates within the same machine that hosts the destination VM for the processed packet. However, delivery observations can also be generated for the delivery of packets to external network gateways, logical routers, interconnects to a different logical switch managed by a different controller, or other entities that connect to a logical port of a logical switch.

As shown at the first stage 505, the MFE 500 includes one or more forwarding tables 525 and one or more registers 530. Like the forwarding tables of the MFE 400, the forwarding tables 525 of some embodiments include forwarding entries pushed down to the MFE 500 from a network controller as physical control plane data and then converted into physical forwarding plane data by the MFE. The forwarding tables 525, in some embodiments, include entries for several unaffiliated logical networks that are virtualized over the physical network. For instance, if the machine on which the MFE 500 resides hosts VMs belonging to five different logical networks, then the forwarding tables 525 include entries for these five different networks, while maintaining isolation between the networks.

Like the registers of the MFE 400, the registers 530 serve as temporary, quick-access storage for information while processing a packet. Some embodiments resubmit a packet to the forwarding tables of the MFE several times in order to fully process the packet. During this processing, the MFE 500 uses the registers 430 to temporarily store information (e.g., logical context information, packet tracing information, etc.) about the packet. In addition, some embodiments send the contents of the registers to the controller as part of an observation message.

At the first stage 505, the MFE 500 receives a packet 535 through a tunnel from a different MFE. The packet 535 is similar to the packet 435 after the fourth stage 420 of FIG. 4, in that the packet is encapsulated with a logical context and tunnel information. While the tunnel through which the packet is sent terminates at two MFEs, in between these two MFEs may be one or more unmanaged forwarding elements that make up a physical network over which packets are sent. In addition, like the packet of the previous figure, the packet 535 includes a payload and a set of headers. As illustrated, the headers include a trace indicator bit that is set to "1" to indicate that the packet is a traced packet. In some embodiments, this bit is set within a logical VLAN field of the header. While shown as a single bit, some embodiments use more than one bit in the logical VLAN field or a different location of the packet to indicate that a packet is traced. In addition, appended to the payload (either within the payload portion of the packet or after the payload portion), the packet 535 includes trace operation data. As described above for FIG. 4, this trace operation data includes, in some embodiments, a controller ID that identifies the issuing controller as well as a trace operation session ID that identifies the particular trace operation that issued the packet. Because this packet is received through a tunnel and not from a controller, no register data is set initially. Instead, the physical input port is identified (because the packet actually is received through a physical port as network traffic in this case) and stored in a register.

The MFE 500 receives the packet 535 and begins processing the packet through its forwarding tables. As mentioned, the forwarding tables include numerous flow entries (e.g., on the order of hundreds or thousands of entries) which take the form a match and corresponding set of actions. That is, if the packet matches a flow entry, the entry specifies a set of actions to take. In addition, in some embodiments the flow entries have different priorities, such that if two or more entries are matched, the MFE performs the action or actions for the entry with the highest priority. As shown by the thicker line in the forwarding tables 525 in the second stage 510, at this stage a flow entry is matched that specifies to modify a particular bit in a particular register in order to indicate that the current packet is a traced packet. Thus, as shown, one of the registers 530 is modified to specify this trace indicator bit.

In the third stage 515, a different flow entry is matched, as shown by the thicker line in the forwarding tables 525. This flow entry specifies to deliver the packet to a its destination logical port. Not shown in this diagram are several processing entries that would be matched in between the second and third stages 510 and 515 in some embodiments. In some embodiments, to get to the point of delivering the packet to a logical port, the MFE would have already removed the tunnel encapsulation, read the logical context into a register, etc.

At the fourth stage 520, the resubmitted packet matches a flow entry to write data to the registers for the packet, send an observation to the controller based on (i) the trace indicator bit stored in the register and (ii) the decision made at the third stage 515 to deliver the packet to its destination logical port, and to drop the packet (i.e., not actually deliver the packet to the logical port). As shown, the MFE sends an observation message to the network controller that issued the packet (in some embodiments, all of the MFEs within a single domain are managed by one controller). In some embodiments, this observation message contains (i) the packet as generated by the controller (i.e., without the logical context and tunnel encapsulation) and (ii) the contents of the registers for the packet. As such, in some embodiments the flow entry that specifies to send the observation also specifies that the MFE first write certain data into the registers.

This data, which is then sent as part of the observation message 540, includes (i) an indicator that the observation is a delivery observation (i.e., that the traced packed would have been successfully delivered to a logical port if it was a real data packet), (ii) a MFE ID specifying that the MFE 500 is sending the observation, and (iii) a physical port ID denoting the port to which the packet would have been delivered. Some embodiments also send the destination logical port, while in other embodiments the controller determines this data based on its stored network state information. One of ordinary skill in the art will recognize that different delivery observations may include different information.

As indicated, the MFE 500 sends the packet 535 to the controller as part of the observation message. In some embodiments, the MFE sends the packet without the encapsulations (i.e., just the original headers, payload, and trace operation data). In other embodiments, the MFE sends to the controller the packet with the encapsulations as received from the previous MFE. The controller, in some embodiments, only uses the packet to read the trace data stored in the packet (e.g., the controller ID and the trace operation session ID), and reads all other pertinent information from the register contents sent as the observation message. Furthermore, as noted, the MFE does not deliver the packet to its destination, because it is only a test packet. Because the packet is inserted at a first MFE and dropped by a second MFE, the test packets are never seen by the endpoints (e.g., the VMs), and thus do not affect the user workloads in any way.

III. Example Packet Tracing Operations

The above sections described in detail the operation of the network controllers and managed forwarding elements of some embodiments. The following section describes three example packet tracing operations and the observations sent to the controller for these operations. In these three examples, the packets are all delivered to their endpoint, in order to illustrate the full scope of observations sent for various examples. However, one of ordinary skill in the art will recognize that in the situations, for various different reasons (e.g., corrupted flow entries in the forwarding tables of one or more MFEs), the packets may not be fully delivered, in which case some of the observations may not be sent.

Figure 6:
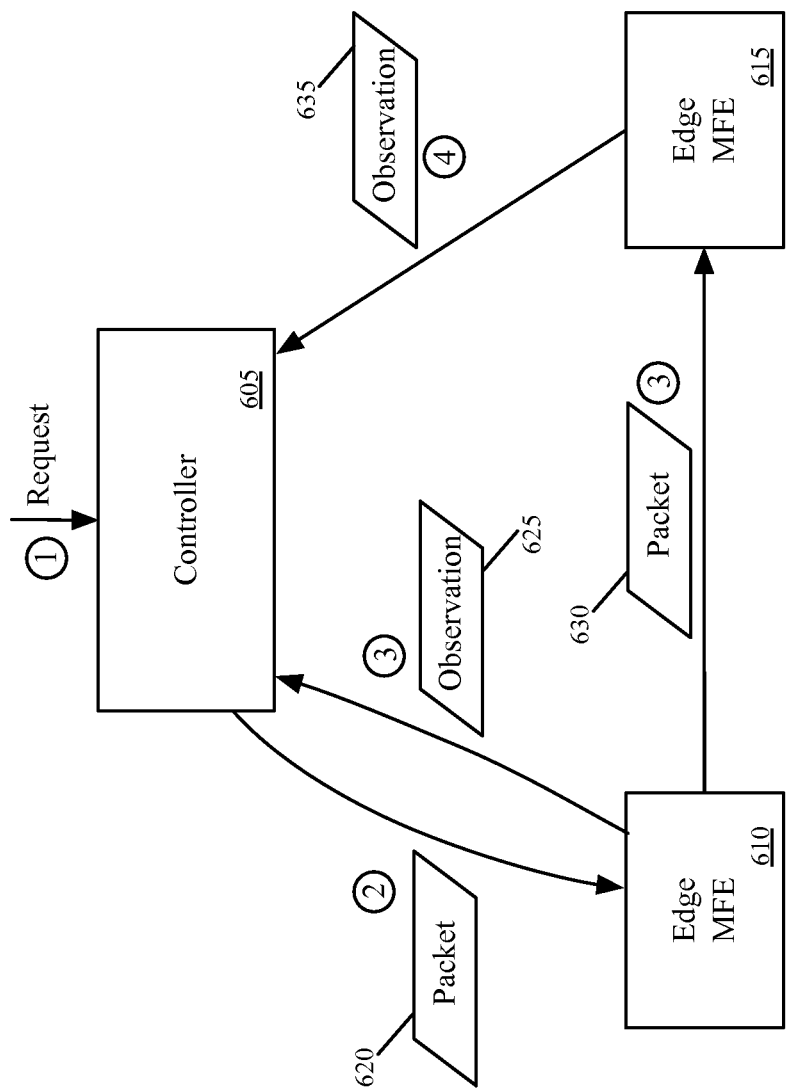
FIG. 6 conceptually illustrates a first example for a traced packet that is sent directly from a first MFE to the destination MFE.

FIG. 6 conceptually illustrates a first example for a traced packet that is sent directly from a first MFE to the destination MFE. As shown, this example illustrates a controller 605, a first edge MFE 610, and a second edge MFE 615. In addition, the figure illustrates various packets and observations with encircled numbers that indicate an order in which the various data (packets, observation messages) are sent within the network.

As shown by the encircled 1, initially the controller 605 receives a request (e.g., as described above by reference to FIG. 2). In this case, the request specifies a source logical port that maps to a VM connected to the first MFE 610 and a destination logical port that maps to a VM connected to the second MFE 615. In response to the request, the controller 605 generates a packet 620 and sends this to the MFE (shown by the encircled 2), along with a command to process the packet. The header of the packet 620 specifies the source and destination addresses received in the request, as well as a trace indicator that marks the packet as a test packet for a trace operation.

The first edge MFE 610 processes the packet (e.g., as shown above in FIG. 4), and its forwarding table entries in some embodiments indicate to (i) encapsulate the packet with a logical context tag that specifies a destination logical port corresponding to the destination MAC address and (ii) further encapsulate the packet using tunnel encapsulation with an IP address for a port of the second MFE 615. Furthermore, the forwarding table entries also specify to send an observation message to the controller because a register bit at the MFE has been modified to identify the packet as associated with a trace operation. Thus, as shown by the encircled 3, the first MFE 610 sends both an observation 625 to the controller 605 and a packet 630 to the second MFE 615. In some embodiments, this is a forwarding observation message that specifies the ID of the MFE 610 and the tunneling information between the two MFEs, as described above by reference to FIG. 4. The packet 630 is the same as the packet 620 in some embodiments, with the additional encapsulations mentioned above.

The MFE 615 receives this packet 630, which still includes the trace indicator, and is encapsulated with the destination logical port. The receiving MFE 615 reads this destination logical port and identifies (via its forwarding table entries) to deliver the packet to the VM associated with the destination logical port. However, based on additional entries that (i) modify a register at the MFE to indicate the trace packet and (ii) read this register when delivering to the logical port, the MFE 615 instead drops the packet and sends an observation 635 (indicated by the encircled 4) to the controller 605. In some embodiments, this is a delivery observation message that specifies the ID of the MFE 615 and the port to which the packet would have been delivered, as described above by reference to FIG. 5.

Figure 7:
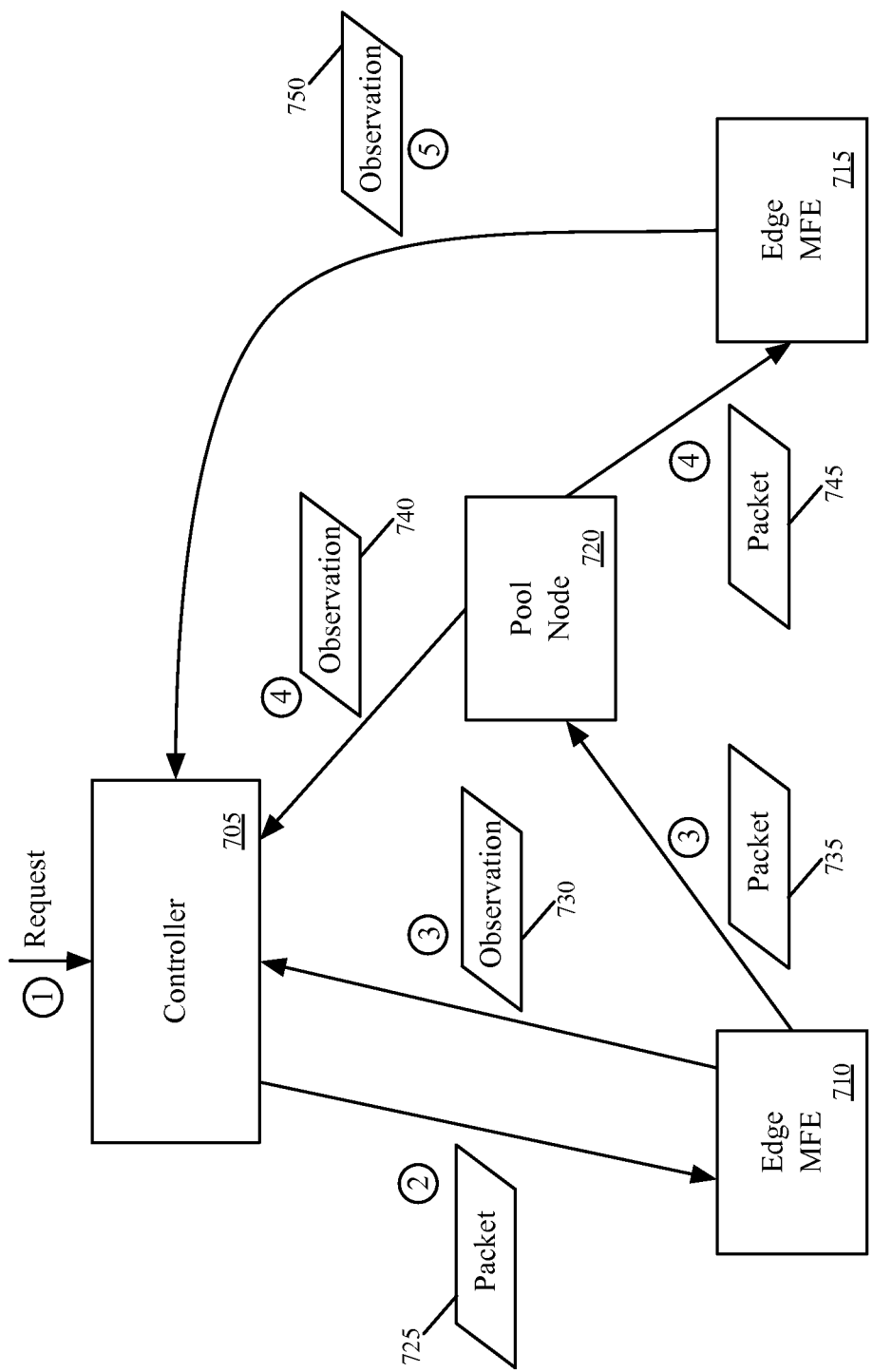
FIG. 7 conceptually illustrates a second example for a traced packet that is sent through a pool node between the source MFE and destination MFE.

The above example illustrates a simple case in which a direct tunnel exists between the source and destination MFEs. FIG. 7 conceptually illustrates a second example for a traced packet that is sent through a pool node between the source MFE and destination MFE. As shown, this example illustrates a controller 705, a first edge MFE 710, a second edge MFE 715, and a pool node 720 (also an MFE). In addition, as with the previous figure, the example illustrates various packets and observations with encircled numbers to indicate an order in which the various data (packets, observation messages) are sent within the network.

As shown by the encircled 1, initially the controller 705 receives a request (e.g., as described above by reference to FIG. 2). In this case, the request specifies a source logical port that maps to a VM connected to the first MFE 710 and a destination logical port that maps to a VM connected to the second MFE 715. In response to the request, the controller 705 generates a packet 725 and sends this to the MFE 710 (shown by the encircled 2), along with a command to process the packet. The header of the packet 725 specifies the source and destination addresses received in the request, as well as a trace indicator that marks the packet as a test packet for a trace operation.

The first edge MFE 710 processes the packet (e.g., as shown above in FIG. 4), and its forwarding table entries in some embodiments indicate to forward the packet to the pool node 720. In some embodiments, this may be because the edge MFE 710 does not have a direct tunnel connection to the edge MFE 715. In this case, the edge MFE 710 (i) encapsulates the packet with a logical context tag that specifies a destination logical port corresponding to the destination MAC address and (ii) further encapsulates the packet using tunnel encapsulation with an IP address for a port of the pool node 720. Furthermore, the forwarding table entries also specify to send an observation message to the controller because a register bit at the MFE has been modified to identify the packet as associated with a trace operation. Thus, as shown by the encircled 3, the first MFE 710 sends both an observation 730 to the controller 705 and a packet 735 to the pool node 720. In some embodiments, this is a forwarding observation message that specifies the ID of the MFE 710 and the tunneling information between the edge MFE 710 and the pool node 720, as described above by reference to FIG. 4. The packet 735 is the same as the packet 735 in some embodiments, with the additional encapsulations mentioned above.

The pool node 720 of some embodiments receives the packet, sets a register bit based on the trace indicator stored in the packet, removes the tunnel encapsulation, and identifies that the destination logical port is located at the edge MFE 715. Thus, much like the edge MFE 710, the pool node encapsulates the packet in a tunnel (this time terminating at the edge MFE 715). As shown by the encircled 4, the pool node 720 sends both an observation 740 to the controller 705 and a packet 745 to the edge MFE 715. In some embodiments, like the observation 730, this is a forwarding observation message that specifies the ID of the pool node 720 and the tunneling information between the pool node 720 and the edge MFE 715, as described above by reference to FIG. 4. The packet 745 is the same as the packet 735 in some embodiments, with the different tunnel encapsulation.

The MFE 715 receives this packet 745, which still includes the trace indicator, and is encapsulated with the destination logical port. The receiving MFE 715 reads this destination logical port and identifies (via its forwarding table entries) to deliver the packet to the VM associated with the destination logical port. However, based on additional entries that (i) modify a register at the MFE to indicate the trace packet and (ii) read this register when delivering to the logical port, the MFE 715 instead drops the packet and sends an observation 750 (indicated by the encircled 5) to the controller 705. In some embodiments, this is a delivery observation message that specifies the ID of the MFE 715 and the port to which the packet would have been delivered, as described above by reference to FIG. 5.

Figure 8:
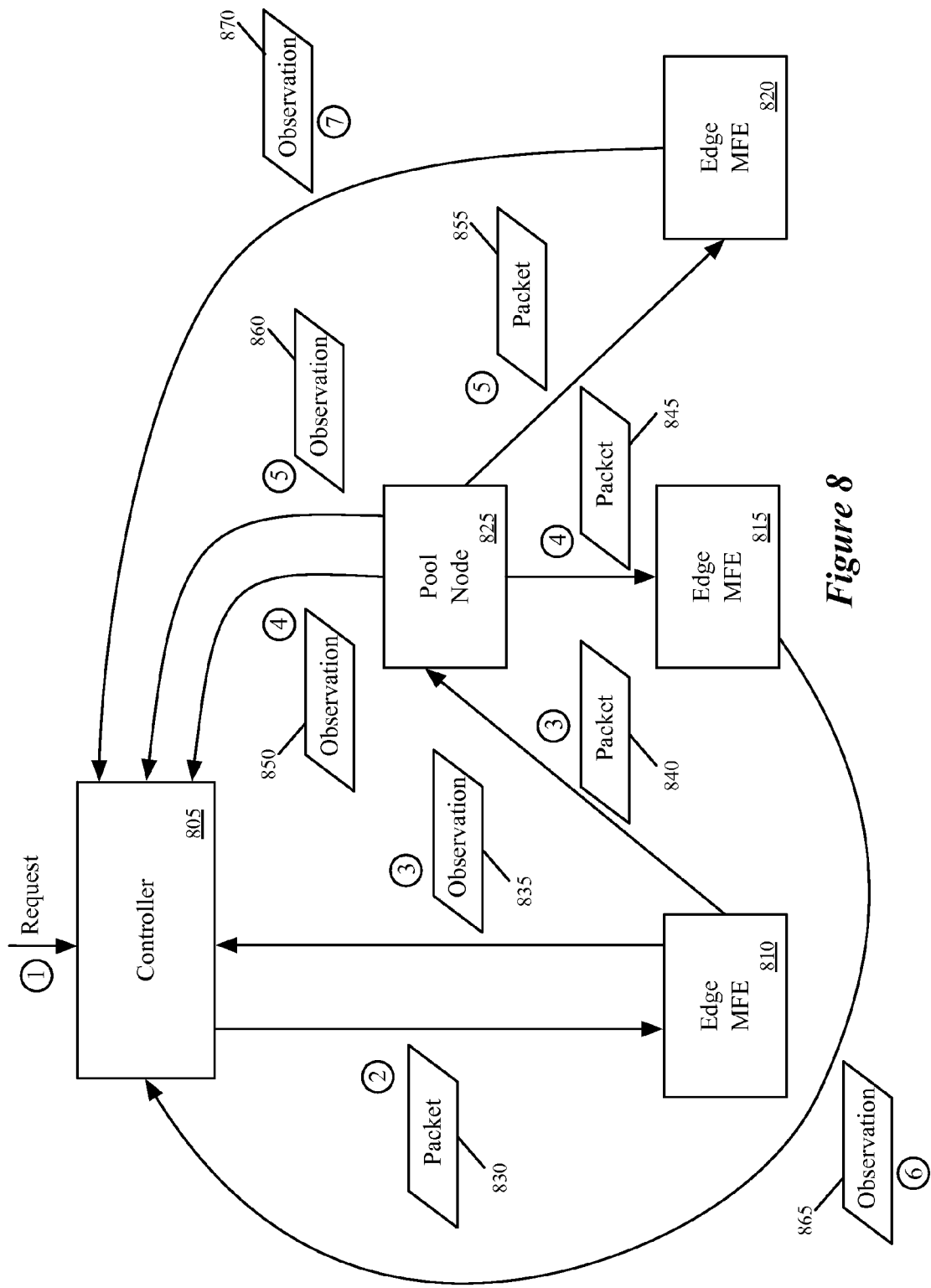
FIG. 8 conceptually illustrates a third example for a traced broadcast packet.

In both of the above examples, the traced packet specifies a singular destination address. FIG. 8 conceptually illustrates a third example for a traced broadcast packet. As shown, this example illustrates a controller 805, a first edge MFE 810, a second edge MFE 815, a third MFE 820, and a pool node 820 (also an MFE). In addition, as with the previous figure, the example illustrates various packets and observations with encircled numbers to indicate an order in which the various data (packets, observation messages) are sent within the network. In this case, the logical switch being examined has only three logical ports corresponding to three VMs, located at the hosts on which the three edge MFEs 810-820 operated.

As shown by the encircled 1, initially the controller 805 receives a request (e.g., as described above by reference to FIG. 2). In this case, the request specifies a source logical port that maps to a VM connected to the first MFE 810. In addition, rather than specifying a particular destination logical port, the request specifies to send a broadcast packet to the logical switch. In response to the request, the controller 805 generates a broadcast packet 830 and sends this to the MFE 810 (shown by the encircled 2), along with a command to process the packet. The header of the packet 830 specifies the source address and the broadcast destination received in the request, as well as a trace indicator that marks the packet as a test packet for a trace operation.

The first edge MFE 810 processes the packet (e.g., as shown above in FIG. 4), and its forwarding table entries in some embodiments indicate to forward broadcast packets to the pool node 825. Furthermore, the forwarding table entries also specify to send an observation message to the controller because a register bit at the MFE 810 has been modified to identify the packet as associated with a trace operation. Thus, as shown by the encircled 3, the first MFE 810 sends both an observation 835 to the controller 805 and a packet 840 to the pool node 825. In some embodiments, this is a forwarding observation message that specifies the ID of the MFE 810 and the tunneling information between the edge MFE 810 and the pool node 825, as described above by reference to FIG. 4. The packet 840 is the same as the packet 840 in some embodiments, with the additional tunneling encapsulation mentioned above.

The pool node 825 of some embodiments receives the packet, sets a register bit based on the trace indicator stored in the packet, removes the tunnel encapsulation, and identifies the packet as a broadcast packet. In some embodiments, the pool node 825 converts the broadcast packet into a set of unicast packets with the different destinations of the MAC addresses connected to the logical switch (excluding the source address). For each of these unicast packets, the pool node 825 (i) encapsulates the packet with a logical context tag specifying the destination logical port for the packet and (ii) further encapsulates the packet using tunnel encapsulation with an IP address for a port of the destination MFE at which the logical port is located. Thus, as shown by the encircled 4 and 5, the pool node sends (i) a packet 845 to the edge MFE 815 and a corresponding observation 850 to the controller 805, and (ii) a packet 855 to the edge MFE 820 and a corresponding observation 860 to the controller 805. Each of these observations is a forwarding observation indicating the respective tunneling data to the MFEs.

Each of the MFEs 815 and 820 receive their respective packets 845 and 855, which still include the trace indicator and are encapsulated with their respective destination logical ports. The receiving MFEs 815 and 820 read the destination logical ports and identify (via their forwarding table entries) to deliver their packets to the VMs associated with the destination logical ports. However, based on additional entries at each of the MFEs that (i) modify a register at the MFE to indicate the trace packet and (ii) read this register when delivering to the logical port, the MFEs 815 and 820 instead drop the packets and sends observations 865 and 870 (indicated by the encircled 6 and 7) to the controller 805. In some embodiments, each of these are delivery observation messages that specify the ID of the MFE 815 and 820 respectively, and the ports to which the packets would have been delivered, as described above by reference to FIG. 5.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
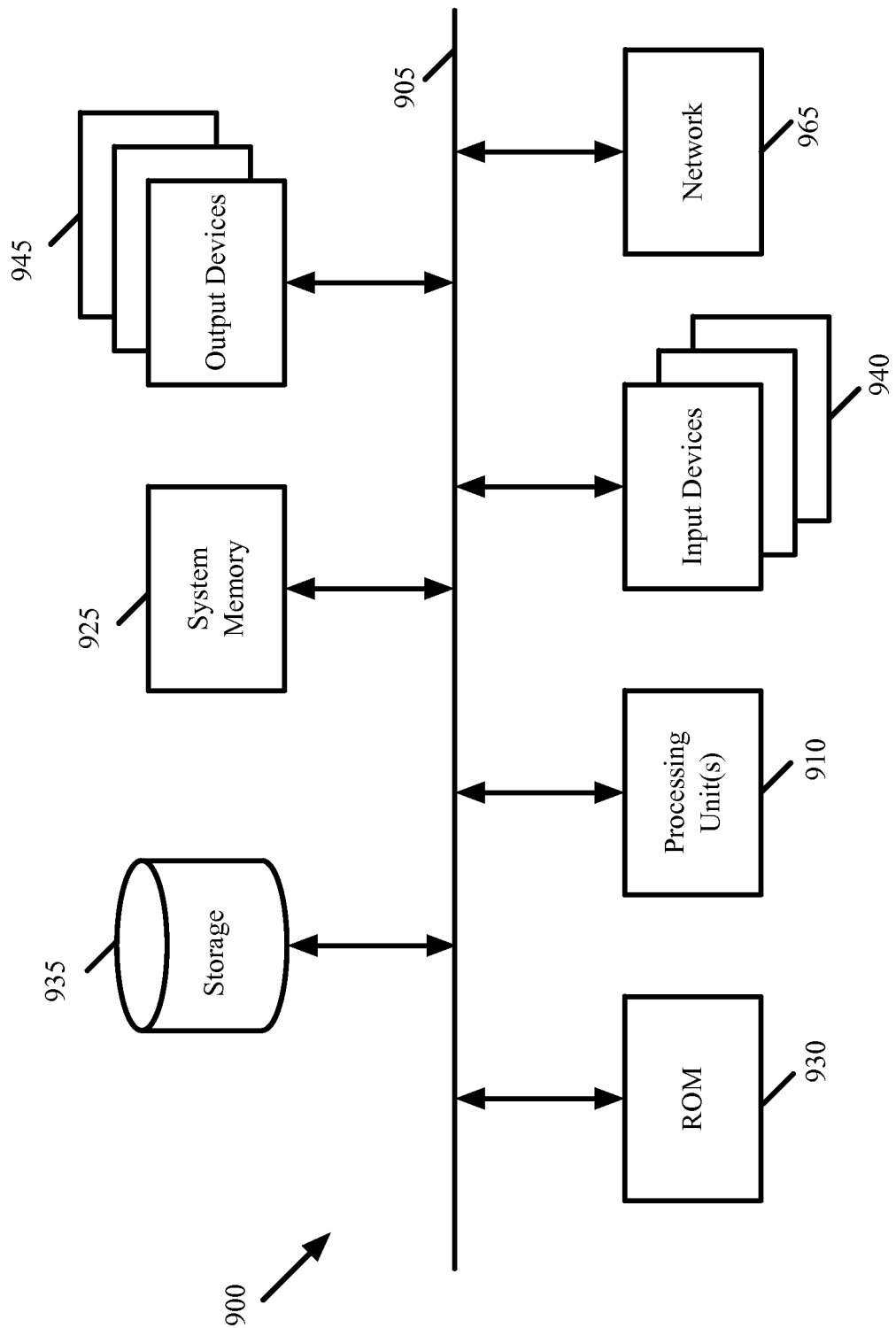
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller that manages a plurality of managed forwarding elements, a method comprising:
    receiving a request to trace a specified packet having a particular source on a logical switching element;
    generating the packet at the network controller according to the packet specification, the generated packet comprising an indicator that the packet is for a trace operation;
    sending the packet to a managed forwarding element associated with the particular source; and
    receiving a set of messages from a set of managed forwarding elements that process the packet regarding operations performed on the packet,
    wherein each managed forwarding element in the set generates a message based on a set of flow entries in its forwarding table, each flow entry of the forwarding table specifying (i) a matching condition and (ii) a corresponding set of actions that the managed forwarding element is to perform when the specified matching condition is met.

2. The method of claim 1, wherein the particular source is a logical port of the logical switching element.

3. The method of claim 2, wherein the logical port is associated with a MAC address of a virtual interface of a virtual machine that connects to the logical switching element.

4. The method of claim 2, wherein the logical port is associated with an external network to which the logical switching element connects, wherein a plurality of different managed forwarding elements are associated with the logical port, the method further comprising selecting one of the plurality of different managed forwarding elements associated with the logical port.

5. The method of claim 4, wherein the plurality of managed forwarding elements associated with the logical port comprises a plurality of extenders with physical interfaces that receive packets from the external network.

6. The method of claim 2, wherein the logical port is associated with a remote domain to which the logical switching element connects, wherein a plurality of different managed forwarding elements are associated with the logical port, the method further comprising selecting one of the plurality of different managed forwarding elements associated with the logical port.

7. The method of claim 6, wherein the plurality of managed forwarding elements associated with the logical port comprises a plurality of pool nodes that connect to different pool nodes at the remote domain via tunnels.

8. The method of claim 1, wherein the set of messages comprises a message from each managed forwarding element that encapsulates the packet in a tunnel and sends the packet through the tunnel.

9. The method of claim 8, wherein each message regarding sending a packet into a tunnel comprises an identifier for the managed forwarding element that encapsulates the packet and an identifier for the tunnel through which the packet is sent.

10. The method of claim 8, wherein when the managed forwarding element to which the packet is sent by the network controller sends the packet directly to a destination managed forwarding element, only one message regarding sending a packet into a tunnel is received by the network controller.

11. The method of claim 8, wherein when the managed forwarding element to which the packet is sent by the network controller sends the packet to a pool node which then sends the packet to a destination managed forwarding element, multiple messages regarding sending the packet into tunnels are received by the network controller.

12. The method of claim 1, wherein the set of messages comprises a message from a destination managed forwarding element that delivers the packet to a logical port of the logical switching element.

13. The method of claim 12, wherein the message from the destination managed forwarding element comprises an identifier for the destination managed forwarding element and a port identifier.

14. The method of claim 1, wherein sending the packet comprises sending a command to modify at least one register of the managed forwarding element.

15. The method of claim 1, wherein the specification of the packet comprises a destination address for the packet.

16. The method of claim 1, wherein the specification of the packet comprises an indication that the packet is a broadcast packet.

17. A non-transitory machine readable medium storing a program for execution by at least one processing unit of a network controller that manages a plurality of managed forwarding elements, the program comprising sets of instructions for:
    receiving a request to trace a packet between a source address and destination address on a same logical switching element;
    generating a packet from the source address to the destination address at the network controller, the generated packet comprising an indicator that the packet is for a trace operation;
    sending the packet to a managed forwarding element to which an entity associated with the source address connects; and
    receiving a set of messages from a set of managed forwarding elements that process the packet regarding operations performed on the packet,
    wherein each managed forwarding element in the set generates a message based on a set of flow entries in its forwarding table, each flow entry of the forwarding table specifying (i) a matching condition and (ii) a corresponding set of actions that the managed forwarding element is to perform when the specified matching condition is met.

18. The machine readable medium of claim 17, wherein the source address and destination address are MAC addresses of virtual interfaces (VIFs) of virtual machines (VMs).

19. The machine readable medium of claim 17, wherein the set of messages comprises a message from each managed forwarding element that encapsulates the packet in a tunnel and sends the packet through the tunnel.

20. The machine readable medium of claim 17, wherein the set of messages comprises a message from a destination managed forwarding element that delivers the packet to a logical port of the logical switching element.

21. The machine readable medium of claim 17, wherein the destination address is a broadcast destination on the logical switching element.

22. The machine readable medium of claim 17, wherein no messages are received when the packet is dropped prior to being sent from the managed forwarding element.

23. For a network controller that manages a plurality of managed forwarding elements, a method comprising:
- generating a first set of flow entries for configuring one of the managed forwarding elements to perform a set of forwarding operations on packets sent on a logical switching element;
- generating a second set of flow entries for configuring the managed forwarding element to send a message to the network controller when the managed forwarding element processes and forwards a packet that comprises an indicator that the packet is for a trace operation; and
- distributing the first and second sets of flow entries to the managed forwarding element in order to configure the managed forwarding element,
- wherein the managed forwarding element generates the message to send to the network controller based on the flow entries of the second set, wherein each flow entry in the first and second sets specifies (i) a matching condition and (ii) a corresponding set of actions that the managed forwarding element is to perform when the specified matching condition is met.

24. The method of claim 23, wherein the set of forwarding operations comprises logical forwarding operations that encapsulate packets with a destination port on the logical switching element and physical forwarding operations that encapsulate packets in a tunnel to a different managed forwarding element.

25. The method of claim 24, wherein the second set of flow entries are for configuring the managed forwarding element to send a message to the network controller when the managed forwarding element performs a physical forwarding operation on a packet.

26. The method of claim 23, wherein the first and second sets of flow entries are distributed to the managed forwarding element over a same communications channel.

27. The method of claim 26 further comprising:
- receiving a request to trace a specified packet having a particular source on the logical switching element, the particular source connected to the managed forwarding element;
- generating the packet at the network controller; and
- inserting the packet into the managed forwarding element in order to perform a trace operation.

28. The method of claim 27 further comprising receiving a message from the managed forwarding element when the managed forwarding element forwards the packet to a different managed forwarding element.

29. The method of claim 28, wherein the packet is inserted and the message received over a same communications channel over which the flow entries are distributed.

* * * * *